Patented Oct. 2, 1956

2,765,304

NEW OX-DIAZOLE COMPOUNDS AND PROCESS FOR THEIR MANUFACTURE

Adolf Emil Siegrist and Eduard Moergeli, Basel, and Kurt Hoelzle, Liestal, Switzerland, assignors to Ciba Limited, Basel, Switzerland, a Swiss firm No Drawing. Application May 18, 1953, Serial No. 355,842

Claims priority, application Switzerland May 21, 1952

19 Claims. (Cl. 260—240)

This invention concerns the manufacture of colorless or almost colorless compounds which contain one or more 1:3:4-ox-diazole rings and groups capable of forming salts and which exhibit in solution or when applied to a substratum a green-blue to violet fluorescence in daylight or ultra-violet light. These compounds correspond to the general formula

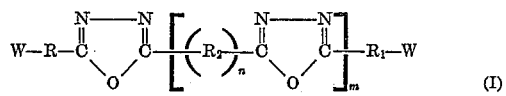

in which R, R₁ and R₂ represent any desired organic residues which must not contain atom groups imparting dyestuff-character to the molecule and at least one of the said residues must contain a system of conjugated double bonds which are in conjugated relation with the double bonds of the adjoining ox-diazole ring and in which W represents a group capable of forming salts, the index $m$ stands for nought or a small number and the index $n$ for nought or 1.

Under the expression "groups capable of forming salts" which are represented by W in the above formula sulfonic acid and carboxylic acid groups may be understood on the one hand, and on the other primary, secondary or tertiary amino groups. The two groups W capable of forming salts may be similar or different. The residues R, R₁ and R₂ may be of an aromatic, aliphatic, araliphatic or heterocyclic nature and may contain if desired substituents not imparting dyestuff-character to the molecule, such as halogen atoms, alkyl or alkoxy groups.

There are various methods of preparing the compounds of the aforementioned general formula. It is possible (1) to subject compounds of the general formula

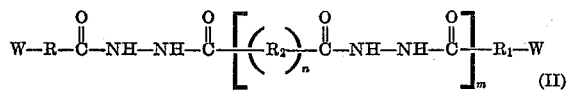

in which R, R₁ and R₂ have the above signification provided that in at least one of these residues the carbon atom which connects the residue with the atom grouping

lies in a system of conjugated double bonds, and in which W and the indices $m$ and $n$ have the above meanings, to the action of an agent capable of splitting off water.

(2) It is possible to start with those compounds of the formula shown in (1) which contain no groups W capable of forming salts and introduce them, especially sulfonic acid groups, during or after the formation of the ox-diazole ring.

(3) In finished ox-diazole compounds having atom groupings which can be converted into groups (W) capable of salt-formation such conversion may be made.

(4) In carrying out the reactions according to (1) and (2) it is also possible to start with components forming N:N'-diacylhydrazine and to carry out the formation of hydrazide and the closing of the ox-diazole ring in one step. Finally it is also possible to combine the various reaction methods in a suitable way. The choice of the reaction series will largely depend on the availability of the starting materials.

The compounds required for the conversion according to (1) are carboxylic acid-N:N'-dihydrazides. As both residues R and R₁ of the above formula possess grouping W capable of salt-formation there are required dicarboxylic acids, sulpho-carboxylic acids or amino-carboxylic acids for the manufacture of the N:N'-diacylhydrazines. There may be mentioned for instance terephthalic acid, isophthalic acid, fumaric acid, oxalic acid, maleic acid, sulpho-benzoic acid, para-dimethylaminobenzoic acid. These carboxylic acids or reactive derivatives thereof, such as halides, esters or anhydrides, are converted with hydrazine or salts thereof, for instance, hydrazine sulphate, by known methods into N:N'-dihydrazides, whereby mixed hydrazides of several carboxylic acids or polyhydrazides with more than one hydrazide grouping can also be manufactured. Finally the formation of the ox-diazole ring can be effected by treatment with agents capable of splitting off water. For this purpose there may be considered thionyl chloride, phosphorus pentachloride, para-toluene sulpho-chloride, chloro-sulphonic acid and especially concentrated sulphuric acid which contains sulphur trioxide dissolved therein, that is to say, oleum of various concentrations. Ring closure to form the ox-diazole ring is advantageously carried out by heating the starting compounds with the condensing agent capable of splitting off water. The necessary temperatures and reaction times depend on the reactivity of the compounds to be reacted together and can easily be determined by a few preliminary experiments. It may be of advantage, if desired, to work with an inert solvent such as nitrobenzene, chlorobenzene or methylene dichloride.

The reaction method (2) is chosen mainly when sulphonic acid groups are to be introduced and the starting materials are easily sulphonated. In such cases it is advantageous to use as a ring closing agent either oleum or chloro-sulphonic acid, because it is thus possible to carry out ring closure and sulphonation in one step. When using for instance N:N'-cinnamic acid dihydrazide or N:N'-naphthalene carboxylic acid-(1)-dihydrazide it is possible, if oleum is employed as condensing agent, to obtain sulphonated ox-diazoles direct. The synthesis of ox-diazole compounds when using components from which the N:N'-diacyl hydrazines are formed (reaction method 4) can be effected on principle under the same conditions as described for reaction methods 1 and 2. By condensing 2 mols of cinnamic acid and 1 mol of hydrazine sulphate in oleum there is obtained for instance the 2:5-bis-[sulphostyryl]-1:3:4-ox-diazole. A combination of various reaction methods is for instance possible if carboxylic acid mono-hydrazide is used as starting material and is reacted with a second carboxylic acid and forms simultaneously the ox-diazole ring. In this way unsymmetrical products can be manufactured. From cinnamic acid mono-hydrazide and diphenyl-4-carboxylic acid there is obtained for instance in condensing in oleum 2-sulphostyryl-5-sulpho-diphenyl-(4')-1:3:4-ox-diazole direct.

Reaction method (3) i. e. the conversion of atom groupings into those which are capable of salt-formation, can be very useful in many cases. It is suitable for instance for the manufacture of compounds having carboxylic groups. In ox-diazole compounds having functional derivatives of a carboxyl group, for example esters or amides, it is possible to convert the latter into a free carboxylic group. It is also possible to convert aromatically bound trichloromethyl groups into carboxylic acid groups. A further possibility for the conversion of groups into those which are capable of salt formation is the reduction of nitro groups to amino groups which can then be alkylated, aralkylated or substituted in another way. In this way an atom grouping imparting dyestuff-character to the molecule can be removed simultaneously. If the ox-diazole compounds contain groupings with at least one active hydrogen atom—either on account of the starting compound having such groupings or because they occur through subsequent conversion of groups—these hydrogen atoms can be further reacted. It may for instance be advantageous to react amino groups with at least one hydrogen atom with compounds introducing groups imparting solubility in water. As such compounds there may be mentioned, for example, aldehyde bisulphite compounds, such as formaldehyde bisulphite or alkyl- or aralkylsulphonic acids or carboxylic acids, such as bromethane sulphonic acid, chloracetic acid or benzyl chloride sulphonic acid or sultones such as butane sultone.

If the new products obtained according to the invention have sulphonic acid- or carboxylic acid groups, it is advantageous to manufacture the water-soluble salts thereof, for example alkali salts or ammonium salts. The preparation of salts with simple amines can also be useful. If the group capable of salt-formation is an amino group it is advantageous to prepare salts with the usual inorganic or organic acids.

Among the compounds of the general Formula (I) mentioned at the beginning those with one or two ox-diazole rings are preferred owing to their easy preparation.

Compounds with one ox-diazole ring correspond to the general formula

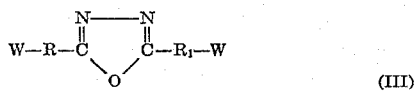

(III)

those with 2 rings to the general formula

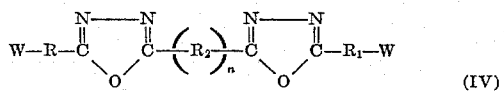

(IV)

The most important reaction methods described hereinbefore are schematised as follows for the manufacture of compounds with one or two ox-diazole rings.

Manufacture of compounds with one ox-diazole ring (Formula III):

(a)  W—R—C(=O)—NH—NH—C(=O)—R₁—W  ⟶  III

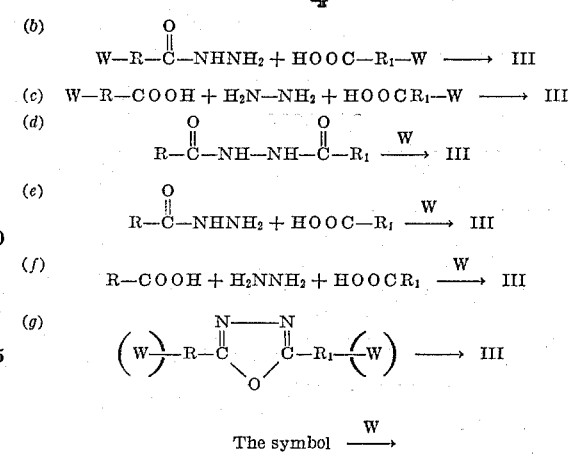

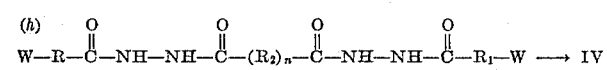

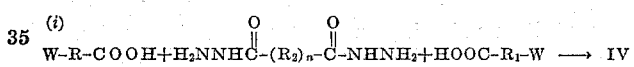

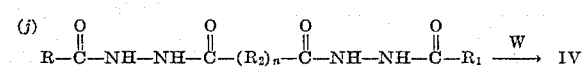

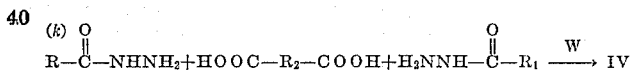

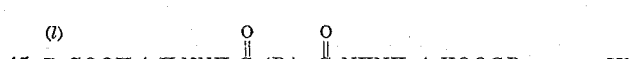

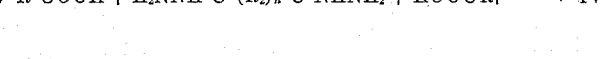

The symbol  W⟶ in (d), (e) and (f) means that the group capable of salt formation is introduced during or after the ox-diazole ring closure. The symbol (W⟩— in g)

stands for an atom group which can be converted into a group capable of salt formation.

Preparation of compounds with 2-ox-diazole rings (Formula IV)

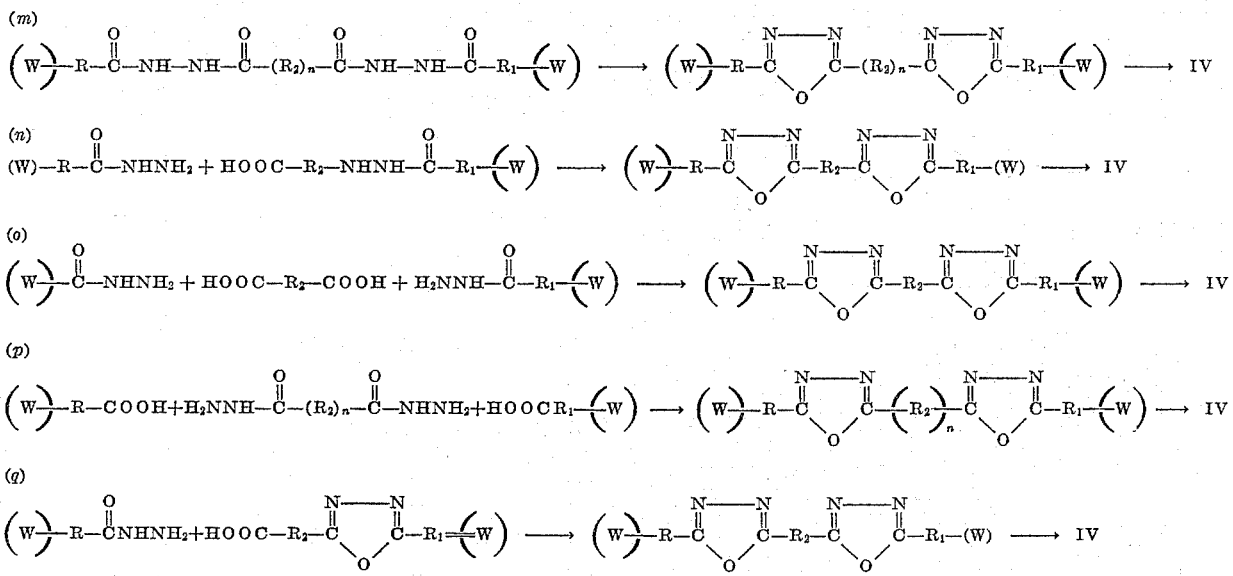

The symbols

and (W) in (j) to (l) and (m) to (q), respectively, have the same meaning as above.

Owing to their fluorescent properties, the preparation of those compounds of Formulae III or IV is particularly interesting in which each of the residues R and $R_1$ has a system of conjugated double bonds in conjugated relation with ox-diazole double bonds, and in which $n$ is either nought or, if $n$ is 1, the residue $R_2$ contains at least one double bond in conjugated relation with the double bonds of the adjoining ox-diazole rings. The preparation of compounds of this kind is possible if starting materials for the above reaction methods are chosen in which R and $R_1$ represent an araliphatic residue, particularly the styryl residue, or an aromatic residue, for example a phenyl- diphenyl- or naphthyl-residue. For $R_2$ there come into consideration alkenylene residues, for example an ethylene residue, or advantageously arylene residues, especially the 1:4 and 1:3 phenylene residue.

As examples of compounds which can be prepared according to the various processes the following may be mentioned:

(1.) 2:5-bis-(sulpho-styryl) - 1:3:4 - ox - diazole of the formula

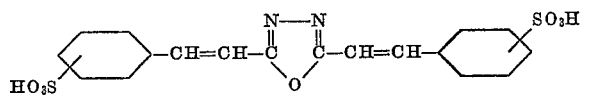

(2.) 2:5-bis-(sulpho-2'-chloro-styryl)-1:3:4 - ox - diazole of the formula

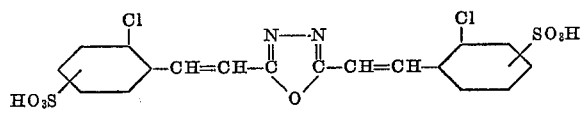

(3.) 2:5-bis-(sulpho-4'-chloro-styryl)-1:3:4 - ox - diazole of the formula

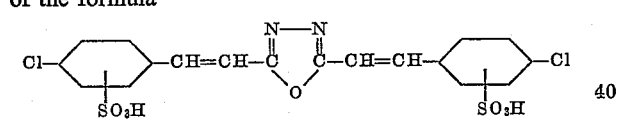

(4.) 2:5-bis-(sulpho-4'-methyl - styryl) - 1:3:4 - ox - diazole of the formula

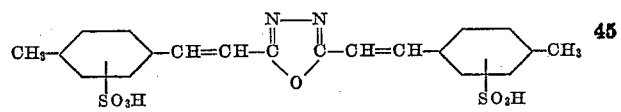

(5.) 5-sulpho-styryl-2-[5'-sulpho - styryl - 1':3':4' - ox-diazolyl-(2')-]-1:3:4-ox-diazole of the formula

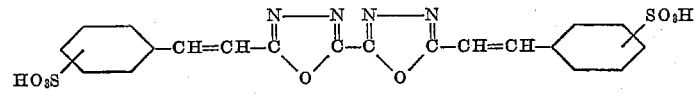

(6.) 1-[5'-sulpho-styryl-1':3':4'-ox-diazolyl-(2')] - 4 - [5''-sulpho-styryl-1'':3'':4''-ox-diazolyl - (2'')] - benzene of the formula

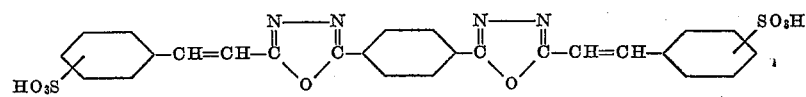

(7.) α:β-Bis-[5-sulpho-styryl-1:3:4 - ox - diazolyl-(2)]-ethylene of the formula

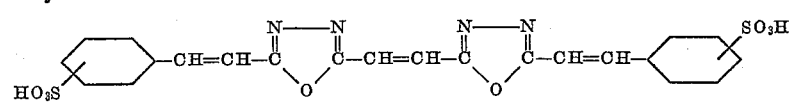

(8.) 2:5-bis-[sulpho-diphenyl-(4')]-1:3:4-ox - diazole of the formula

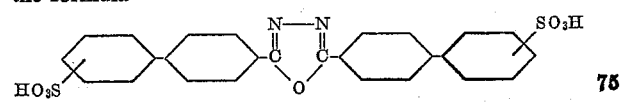

(9.) Sulphonated 2:5-bis - [naphthyl - (1')] - 1:3:4 - ox-diazole of the formula

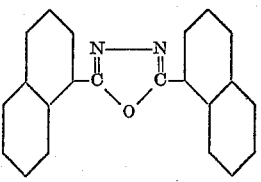

(10.) 2-sulpho-styryl - 5 - [sulpho-diphenyl-(4')]-1:3:4-ox-diazole of the formula

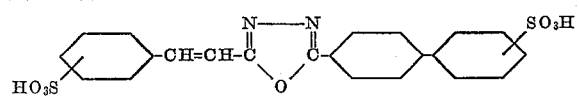

(11.) 2:5-bis-[4'-dimethylamino-phenyl-(1')] - 1:3:4-ox-diazole of the formula

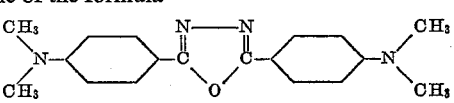

(12.) 2:5-bis-[4' - diethylamino - phenyl - (1')] - 1:3:4-ox-diazole of the formula

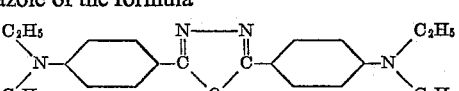

(13.) 2:5 - bis - [4' - sulphomethylamino - phenyl-(1')]-1:3:4-ox-diazole of the formula

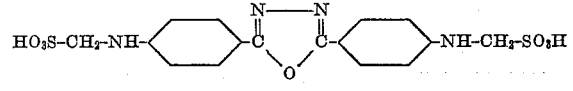

(14.) 2:5 - bis - [4' - carboxy - phenyl - (1')] - 1:3:4-ox-diazole of the formula

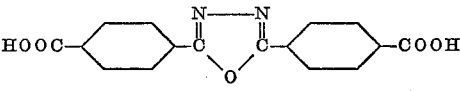

(15.) 2:5 - bis - [3' - carboxy - phenyl - (1')] - 1:3:4-ox-diazole of the formula

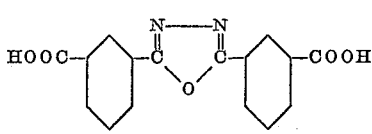

(16.) 2:5 - bis - [4'' - carboxy - diphenyl - (4')] - 1:3:4-ox-diazole of the formula

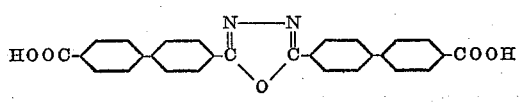

(17.) 2 - [4' - carboxy - phenyl - (1')] - 5 - [5" - (4'''- carboxy - phenyl - (1''' - ) - 1'':3":4" - ox - diazolyl - (2")]-1:3:4-ox-diazole of the formula

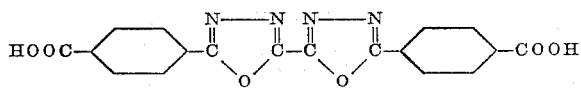

(18.) 2 - [3' - carboxy - phenyl - (1')] - 5 - [5" - (3'''- carboxy - phenyl) - (1''') - 1":3":4" - ox - diazolyl - (2")]-1:3:4-ox-diazole of the formula

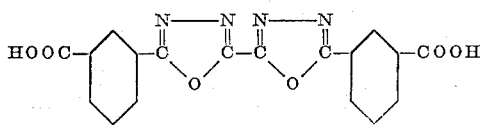

(19.) 1 - [5' - (4''' - carboxy - phenyl) - (1''') - 1':3':4' - ox - diazolyl - (2')] - 4 - [5" - (4'''' - carboxy - phenyl) - (1'''') - 1":3":4" - ox - diazolyl - (2")] - benzene of the formula

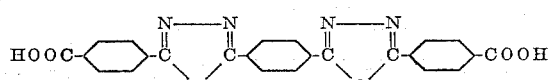

(20.) 1 - [5' - (3''' - carboxy - phenyl) - (1''') - 1':3':4' - ox - diazolyl - (2')] - 4 - [5" - (3'''' - carboxy - phenyl) - (1'''') - 1":3":4" - ox - diazolyl - (2")] - benzene of the formula

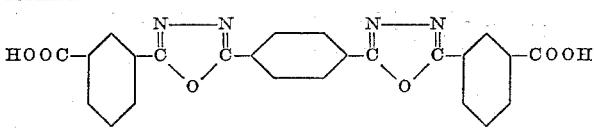

(21.) 2' - [4" - carboxy - phenyl - (1")] - 1':3':4' - ox - diazolyl-(5')-β-acrylic acid of the formula

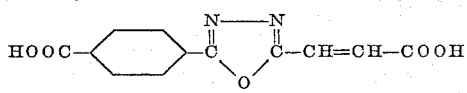

The new compounds of this invention may be used according to their constitution for making organic material impenetrable to ultra-violet rays, for the optic brightening of organic material or as an intermediate product for the preparation of dyestuffs.

The following examples illustrate the invention, the parts being by weight unless otherwise stated and the relationship of parts by weight to parts by volume being the same as that of the kilogram to the litre:

*Example 1*

61 parts of cinnamic acid are slowly added to a solution of 26 parts of hydrazine sulphate in 480 parts of oleum (24 percent, of SO₃), while cooling so that the temperature does not exceed 20° C. The temperature is then raised within 30 minutes to 60° C. and the whole is then stirred for 5–6 hours at 60–65° C. until the quantity of carboxylic acid used in excess no longer diminishes. The whole is then allowed to cool, poured on to ice and stirred for some hours in the cold whereupon the 2:5-bis-(sulpho-styryl)-1:3:4-ox-diazole of the formula

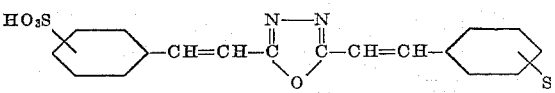

precipitates. By the addition of a salting-out agent such, for example, as cold, saturated sodium chloride solution a further quantity of the condensation product can be separated. The mixture is filtered with suction, and the filter residue is washed with dilute sodium chloride solution and dried. There is obtained a pale powder which dissolves easily in water. Its aqueous solution exhibits a bluish fluorescence when exposed to ultra-violet light.

If and equimolecular quantity of 4-methyl-cinnamic acid, 4-chloro-cinnamic acid or 2-chloro-cinnamic acid is used in the place of the above mentioned cinnamic acid, products with similar properties are obtained.

The quantity of oleum used can also be considerably diminished.

*Example 2*

265 parts of chloro-sulphonic acid are cooled to 5° C. and 29.2 parts of N:N'-di-cinnamoyl-hydrazine are added in small portions while stirring well and cooling so that the temperature does not rise above 30° C. The mixture is then heated while stirring for 3 hours to 60–65° C. and for a further hour to 90–95° C. The clear, pale brown reaction mixture is cooled to 5° C. and then poured on to 500 parts of ice. The precipitated condensation product is filtered with suction and washed with ice-water. The filter residue is suspended in 500 parts of hot water and dilute sodium carbonate solution added dropwise until a lasting, weakly alkaline reaction occurs. The clear solution obtained is finally evaporated to dryness. There is obtained the di-sodium salt of 2:5-bis-(para-sulpho-styryl)-1:3:4-ox-diazole of the formula

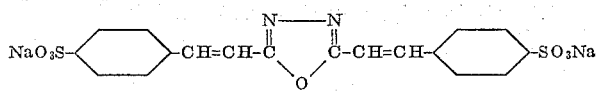

as a pale powder which dissolves easily in water. Its aqueous solution exhibits a bluish fluorescence when exposed to ultra-violet light.

The N:N'-di-cinnamoyl-hydrazine used as starting material can be prepared by condensation of 2 mols of cinnamic acid chloride with 1 mol of hydrazine hydrate in pyridine.

*Example 3*

36.1 parts of naphthalene carboxylic acid-(1) are added to a solution of 13 parts of hydrazine sulphate in 288 parts of oleum (24 percent of SO₃), while cooling and stirring well, in such a way that the temperature does not rise beyond 20° C. The temperature is then increased to 60° C. within 30 minutes and the mixture then stirred for 5–6 hours at 55–60° C., until the quantity of the carboxylic acid used in excess no longer diminishes. The whole is then allowed to cool, poured on to ice and by adding cold saturated sodium chloride solution the condensation product is precipitated. The whole is stirred for some hours in the cold, filtered with suction, washed with dilute sodium chloride solution and the filter residue taken up again in water. By adding dilute sodium carbonate solution there is obtained the sodium salt of sulphonated 2:5-bis-[naphthyl-(1')]-1:3:4-ox-diazole of the formula

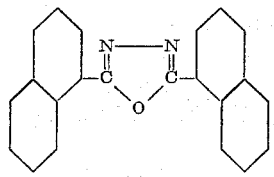

The aqueous solution is evaporated to dryness. The pale powder obtained dissolves easily in water. The aqueous solution exhibits a deep violet-blue fluorescence when exposed to daylight or ultra-violet rays.

If instead of 36.1 parts of naphthalene carboxylic acid-(1) there are used 42.5 parts of diphenyl-4-carboxylic acid which are heated for 6–8 hours to 60–70° C., there is obtained the disodium salt of 2:5-bis-[sulpho-diphenyl-(4')]-1:3:4-ox-diazole of the formula

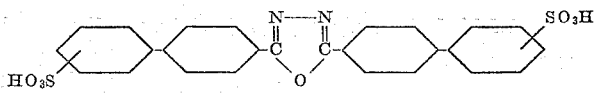

as a pale powder which dissolves easily in hot water. The aqueous solution exhibits a bluish fluorescence when exposed to ultra-violet rays.

Example 4

288 parts of oleum (24 per cent. of SO₃) are cooled to 5° C. and 31.1 parts of cinnamic acid and 11.8 parts of oxalic acid-dihydrazide are added, while cooling and stirring well, so that the temperature does not rise above 20° C. The temperature is then brought to 60° C. within 30–60 minutes and the reaction mass is then stirred, first for 3½ hours at 60–65° C. and then for 30 minutes at 90–95° C. until the quantity of the carboxylic acid used in excess no longer diminishes. The whole is allowed to cool and the reaction mixture is poured on to ice, whereupon the condensation product precipitates in the form of a fine, pale yellow suspension. Thereupon the whole is stirred for quite some time in the cold, filtered quickly with suction and the filter residue re-crystallised from a little boiling water. The 5-sulpho-styryl - 2 - [5' - sulpho - styryl - 1':3':4' - ox - diazolyl-(2')]-1:3:4-ox-diazole of the formula

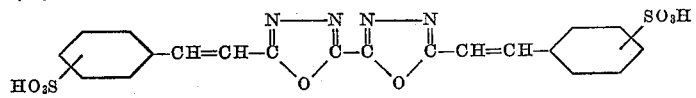

can be obtained by dissolving in hot water, neutralising with dilute aqueous sodium carbonate solution and finally evaporating to dryness as a pale powder in the form of the disodium salt which dissolves easily in water. The aqueous solution exhibits a bluish fluorescence when exposed to ultra-violet light.

If instead of the above mentioned 11.8 parts of oxalic acid dihydrazide there are used 19.4 parts of terephthalic acid dihydrazide, there is obtained the 1-[5'-sulpho-styryl-1':3':4' - ox - diazolyl - (2')] - 4 - [5" - sulpho - styryl-1":3":4"-ox-diazolyl-(2")]-benzene of the formula

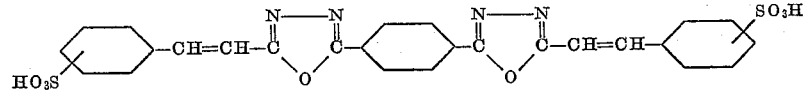

in the form of the disodium salt as a pale powder, which is also easily soluble in water. The aqueous solution exhibits a bluish fluorescence when exposed to ultra-violet light.

Example 5

144 parts of oleum (24 per cent. of SO₃) are cooled to 5° C. 16.2 parts of cinnamic acid hydrazide and 5.8 parts of fumaric acid are added in small portions, while cooling and stirring well, so that the temperature does not rise beyond 20° C. The mixture is then heated within 30 minutes to 60° C. and stirred for 4 hours at 60–70° C. and finally for 30 minutes at 90° C. The red-brown reaction mixture is cooled and poured on to ice. It is then diluted with water and neutralised with calcium carbonate in the warm. The precipitated calcium sulphate is separated by filtering with suction and the filter residue washed with hot water. Sodium carbonate is added to the combined filtrates until its reaction remains weakly alkaline to phenolphthalein. After filtering, the clear solution is evaporated to dryness. There is obtained the disodium salt of α:β-bis-[5-sulpho-styryl-1:3:4-ox-diazolyl-(2)]-ethylene of the formula

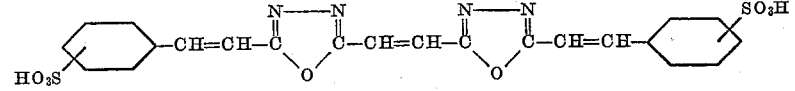

as a water-soluble powder. The aqueous solution exhibits a bluish fluorescence when exposed to ultra-violet light.

Example 6

288 parts of oleum (24 per cent. of SO₃) are cooled at 5° C. 19.8 parts of diphenyl-4-monocarboxylic acid and 16.2 parts of cinnamic acid hydrazide are added in small portions while cooling and stirring well, care being taken that the temperature does not exceed 20° C. The temperature is then increased to 65° C. within 30 minutes and the mixture then stirred for 3 hours at 65–75° C. and for 2 hours at 90–95° C. It is then allowed to cool. The pale brown reaction mixture is poured on to ice, stirred for some hours in the cold, whereupon the 2 - sulpho - styryl - 5 - [sulpho - diphenyl - (4')] - 1:3:4-ox-diazole of the formula

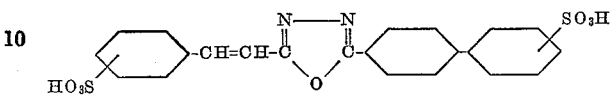

precipitates. By the addition of a salting-out agent such, for example, as a cold, saturated sodium chloride solution, a further quantity of the condensation product separates. The mixture is filtered with suction, and the filter residue is washed with dilute sodium chloride solution and dried. There is obtained a pale powder which dissolves easily in water. The aqueous solution exhibits a bluish fluorescence when exposed to ultra-violet light.

Example 7

36 parts of 4-dimethylaminobenzoic acid are introduced into a solution of 13 parts of hydrazine sulphate in 240 part of oleum (24 per cent. of SO₃) while cooling. The mixture is then heated to 60–70° C. while stirring until the quantiy of carboxylic acid used in excess no longer diminishes. The mixture is then poured on to ice, rendered weakly alkaline with sodium hydroxide solution, while cooling, and the precipitated product is filtered with suction. The filter residue is taken up in 1500 parts of warm water, and the mixture is stirred well and filtered after being allowed to cool. After filtering with suction, and washing and drying the product there is obtained 2:5-bis-[4'-dimethyl-aminophenyl-(1')]-1:3:4-ox-diazole of the formula

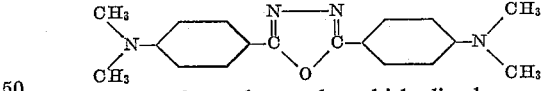

in the form of a pale powder which dissolves easily in dilute mineral acids. Its alcoholic solution exhibits a bluish fluorescence when exposed to ultra-violet light.

From a specimen recrystallised from ethanol there result almost colorless crystals melting at 225–227° C.
*Analysis.*—Calculated C: 70.10%; H: 6.53%; N: 18.17%. Found: C: 70.02%; H: 6.41%; N: 18.16%.

If an equimolecular quantity of 4-diethylaminobenzoic acid is used instead of the above 4-dimethylaminobenzoic acid, a product with similar properties is obtained.

Example 8

A solution of formaldehyde bisulphite is prepared from 260 parts of a sodium bisulphite solution of 40 percent strength by weight and 75 parts of an aqueous solution of formaldehyde of 40% strength, and the solution is rendered weakly alkaline with sodium carbonate. There are added to the solution 30 parts of 2:5-bis-[4'-aminophenyl-(1')]1:3:4-ox-diazole, and the whole is boiled under reflux until the whole of the 2:5-bis- 4'-aminophenyl-(1')]-1:3:4-ox-diazole has dissolved, which takes several hours. The whole is allowed to cool, whereupon the condensation product precipitates. By the addition of a salting-out agent, for example a solution of sodium chloride, the portions remaining in solution can be separated. The mixture is filtered, and the filter residue is washed if necessary with sodium chloride solution, and dried.

There is obtained the disodium salt of 2:5-bis-[4'-sulphomethylaminophenyl-(1')]-1:3:4-ox-diazole of the formula

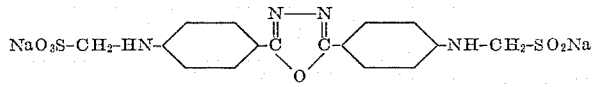

in the form of a grey-white powder which is soluble in water. The solution exhibits a bluish fluorescence when exposed to ultra-violet light.

The 2:5 - bis - [4' - aminophenyl - (1')] - 1:3:4 - oxdiazole used as starting material can be prepared by reacting 2 mols of 4-nitrobenzoyl chloride with 1 mol of hydrazine sulphate in known manner to form N:N'-di-(4-nitrobenzoyl)-hydrazide, and then ring closure is brought about by means of thionyl chloride, phosphorus pentachloride or para-toluene sulphochloride in an organic solvent or by means of chloro-sulphonic acid or oleum.

Alternatively the following process may be used: 70 parts of 4-nitrobenzoic acid are introduced, while cooling, into a solution of 26 parts of hydrazine sulphate in 480 parts of oleum (24% of $SO_3$), and the mixture is then heated at about 60°–80° C. until the quantity of carboxylic acid used in excess no longer diminishes. The mixture is then poured on to ice, filtered with suction, and the filter residue is washed and dried.

There is obtained 61–92 parts of 2:5-bis-[4'-nitrophenyl-(1')]1:3:4-ox-diazole in the form of an almost colorless powder melting at 301°–302° C.

The 2:5-bis-[4'-nitrophenyl-(1')]-1:3:4-diazole may be reduced with iron and glacial acetic acid or with iron and hydrochloric acid in alcohol by the method of Béchamps to form 2:5-bis-[4'-aminophenyl-(1')]1:3:4-ox-diazole. It is a white powder of which alcoholic solutions when exposed to ultra-violet light exhibit a blue fluorescence.

*Example 9*

69.7 parts of isophthalic acid are introduced in small portions into a solution of 26 parts of hydrazine sulphate in 384 parts of oleum (24 percent of $SO_3$) while cooling, care being taken that the temperature does not exceed 20° C. The mixture is then heated for 30 minutes at 55° C. and stirred for 5–6 hours at 55°–65° C. until the quantity of dicarboxylic acid used in access no longer diminishes. The whole is then allowed to cool, and the clear reaction mixture is poured into ice water while stirring, whereupon the condensation product precipitates; it is filtered with suction, and the filter residue is washed several times with water.

For a further purification, the condensation product may be dissolved in cold dilute sodium carbonate solution, freed from insoluble portions by filtration, and precipitated again by acidification with dilute mineral acid. There is obtained 2:5 - bis - [3' - carboxyphenyl - (1')] - 1:3:4-ox-diazole of the formula

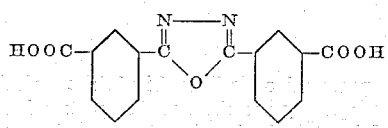

in the form of an almost white powder which is easily soluble in dilute aqueous sodium carbonate solution. The aqueous solution of the disodium salt exhibits a bluish fluorescence when exposed to ultra-violet rays.

*Analysis.*—Calculated: N: 9.04%. Found: N: 8.8%.

If an equal quantity of terephthalic acid is used in the place of the above mentioned isophthalic acid there is obtained 2:5 - bis - [4' - carboxyphenyl - (1')] - 1:3:4-ox-diazole of the formula

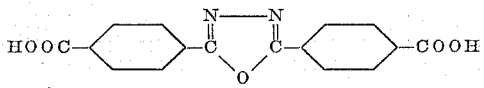

in the form of an almost white powder with similar properties.

*Analysis.*—Calculated: N: 9.04%. Found: N: 9.06%.

If an equimolecular quantity of diphenyl-dicarboxylic acid-(4:4') is used in the place of the isophthalic acid there is obtained 2:5-bis-[4''-carboxydiphenyl-(4')]1:3:4-ox-diazole of the formula

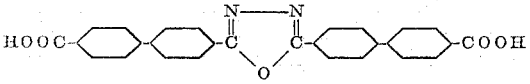

in the form of an almost colorless powder with similar properties.

*Example 10*

10 parts of symmetrical 4:4'-dicarbethoxydibenzoyl-hydrazide are introduced into 100 parts of chlorosulphonic acid at room temperature. The temperature increases by a few degrees while hydrochloric acid gases evolve. The solution obtained is then heated for 20 minutes to 50° C. and then poured into a mixture of water and ice. After stirring for a short time, the precipitated, colorless product is filtered with suction and washed acid-free. The yield amounts to over 90 percent of the calculated yield. The 2:5-bis-[4'-carbethoxyphenyl-(1')]-1:3:4-ox-diazole thus obtained crystallises from aqueous dioxane in the form of needle-shaped leaflets melting at 215° C.

For the purpose of saponification, 3 parts of the ester are boiled with a solution of 10 parts of caustic potash in 50 parts of alcohol for an hour under reflux. By the addition of 250 parts of water the greater part of the suspension is dissolved. The solution is filtered from the insoluble parts and the filtrate is acidified with mineral acid. The precipitated 2:5-bis-[4'-carboxyphenyl-(1')]-1:3:4-ox-diazole of the formula

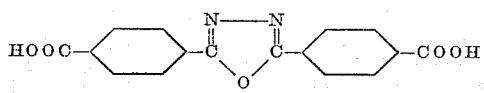

is filtered off, washed and dried. There are obtained 2.3 parts of a colorless powder which is difficulty soluble in the usual solvents. The acid crystallises from a large quantity of γ valerolactone in clusters of handsome needles, which do not melt at 360° C. The acid dissolves smoothly in dilute soda solution.

*Analysis.*—Calculated: C: 61.94%; H: 3.23%; N; 9.04%. Found: C: 62.05%; H: 3.30%; N 8.83%.

The symmetrical 4:4'-dicarbethoxydibenzoyl-hydrazide used above can be obtained for example by reacting terephthalic acid monoethylester chloride with terephthalic acid ethylester mono-hydrazide in pyridine or by reacting 1 mol of hydrazine hydrate with 2 mols of terephthalic acid monoethylester chloride in an inert diluent (for instance chloroform) with the addition of pyridine. The substance crystallises from chlorobenzene in colorless crystals melting at 197–198° C.

In forming ox-diazole, if, instead of using symmetrical 4:4'-dicarbethoxy-dibenzoyl-hydrazide as starting material, there are used hydrazides which are obtained by condensation of phthalic acid or isophthalic acid monoethylester chloride with terephthalic- or isophthalic acid mono-ethylestermonohydrazide, there are obtained after saponification of the ester groups, ox-diazoles which are isomeric with the 2:5-bis-[4'-carboxyphenyl-(1')]-1:3:4-ox-diazole described above and have similar properties.

*Example 11*

2.1 parts of hydrazine hydrate are introduced dropwise into a solution of 12 parts of para-trichloromethylbenzoyl chloride in 133 parts of o-dichlorobenzene at 25–30° C. while stirring. The reaction mixture is then stirred for another 30 minutes, the resulting precipitate filtered off, washed with ether and water, and dried.

The resulting condensation product is dissolved in 87 parts of oleum (24% in SO₃) and heated for 20 minutes at 50–60° C. After cooling, the whole is poured into ice water. The resulting white precipitate represents the practically pure 2:5-bis-[4'-carboxyphenyl-(1')]-1:3:4-ox-diazole which can be further purified by being dissolved in dilute sodium carbonate solution and by filtering off small quantities of insoluble by-products.

*Example 12*

192 parts of oleum (24 per cent of SO₃) are cooled to 5° C. 19.4 parts of terephthalic acid dihydrazide and

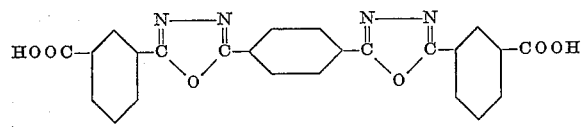

38.5 parts of isophthalic acid are added in small portions while cooling and stirring well, care being taken that the temperature does not exceed 20° C. The whole is then heated for 30 minutes at 55° C. and then stirred for 6 hours at 55–65° C. until the quantity of dicarboxylic acid used in excess no longer diminishes. The mixture is allowed to cool, and the reaction mixture is poured into ice water while stirring, the precipitated condensation product is filtered with suction, and the filter residue washed several times with water. For a further purification the damp filter residue may be dissolved in cold, dilute sodium carbonate solution, freed from insoluble portions by filtration, and by the addition of dilute mineral acid there is separated from the clear filtrate the 1 - [5' - (3''' - carboxyphenyl) - (1''') - 1':3:4' - ox - di - azoyl - (2') - 4 - [5'' - (3'''' - carboxyphenyl) - (4'''')- 1'':3'':4'' - ox - diazolyl - (2'')] - benzene of the formula

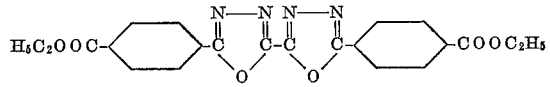

and filtered and the filtered residue washed several times with water and dried. There is obtained an almost colorless powder which dissolves in dilute, aqueous sodium carbonate solution. The aqueous solution of the disodium salt exhibits a bluish fluorescence when exposed to ultra-violet rays.

If the same quantity of terephthalic acid is used in the place of the isophthalic acid described above, there is obtained a product with similar properties. It corresponds to the formula

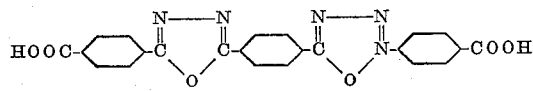

*Example 13*

288 parts of oleum (24 percent of SO₃) are cooled to 5° C. and 36.5 parts of isophthalic acid and 11.8 parts of oxalic dihydrazide are added while cooling and stirring well so that the temperature does not exceed 20° C. The mixture is then heated for 30 minutes at 60° C. and stirred for 4 hours at 60–70° C. and for 30 minutes at 90° C. until the quantity of dicarboxylic acid used in excess no longer diminishes. Then the whole is allowed to cool and the reaction mixture is poured into ice water while stirring, whereupon the condensation product precipitates. After filtering with suction and washing with water, the damp filter residue is dissolved in cold, dilute sodium carbonate solution, filtered to remove insoluble portions. By acidification with dilute mineral acid the 2-[3'-carboxyphenyl-(1')]-5-[5'' - (3''' - carboxyphenyl)-

(1''')-1'':3'':4''-ox-diazolyl-(2'')]-1:3:4-ox-diazole of the formula

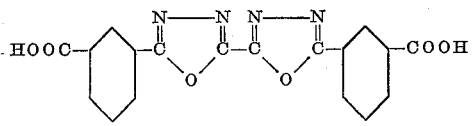

precipitates from the filtrate as a gelatinous precipitate. It is filtered off, washed with water and dried. There is obtained an almost colorless powder, which easily dissolves in dilute, aqueous sodium carbonate solution. The aqueous solution of the disodium salt exhibits a bluish fluorescence when exposed to ultra-violet rays.

*Example 14*

10 parts of the following compound:

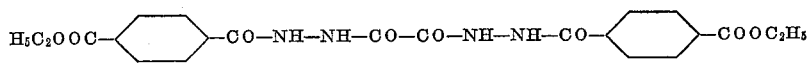

melting at 269–271° C., which is obtained by reacting 1 mol of oxalyl-chloride with 2 mols of terephthalic acid monoethylester-mono-hydrazide or by reacting 2 mols of terephthalic acid monoethylester chloride with 1 mol of oxalic acid dihydrazide, are introduced into 100 parts of chloro-sulphonic acid at room temperature. The mixture is then heated for half an hour at 50° C. and the reaction product is poured into a mixture of ice and water. The precipitated substance having the formula

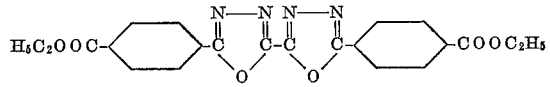

is filtered off and washed free from acid. The ester crystallizes from dioxane in the form of clusters of small crystals melting at 268–270° C.

In order to saponify the ester groups, 5 parts of the reaction product are boiled with a solution of 10 parts of caustic potash in 35 parts of alcohol for an hour under reflux. By the addition of water the whole is dissolved with the exception of a very slight quantity and the solution filtered. By adding mineral acid 2-[4'-carboxyphenyl-(1')]-5-[5''-(4'''-carboxyphenyl) - (1''')-1'':3'':4''-ox-diazolyl-(2'')]-1:3:4-ox-diazole of the formula

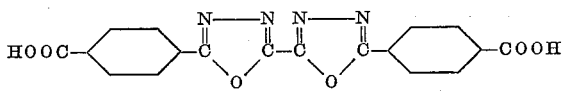

separates from the filtrate in the form of a colorless, gelatinous precipitate. It is filtered off and thoroughly washed with hot water. To purify the precipitated dicarboxylic acid may be dissolved in cold dilute sodium carbonate solution and after filtration, it is again precipitated with mineral acid. The dried acid is a colorless powder which does not melt at 360° C.

*Example 15*

10 parts of the compound of the formula

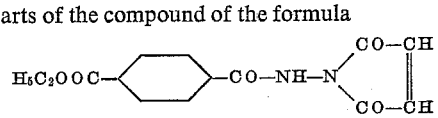

are introduced into 100 parts of chloro-sulphonic acid at room temperature, whereupon the temperature is somewhat increased. The solution obtained is then heated for half an hour at 50° C., cooled and poured into a mixture of ice and water. The precipitated rearrangement product of the formula

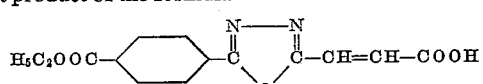

is filtered off and washed acid-free with water. It crystallizes from alcohol in the form of long, silky needles melting at 189° C.

The ester group is saponified by boiling 6 parts of the rearrangement product with 50 parts of alcohol and 15 parts of concentrated sodium hydroxide solution (of 30 percent strength) for 2 hours under reflux, then diluted with 50 parts of water, filtered to remove impurities and acidified with mineral acid. The precipitated, colorless [2'(4''-carboxyphenyl-(1''))-1':3':4'-ox-diazolyl-(5')]-β-acrylic acid of the formula

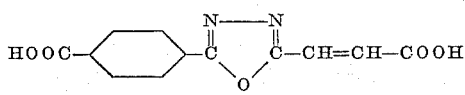

is filtered off and thoroughly washed with hot water. The product is purified by dissolving the acid in cold dilute soda solution and after filtration, it is again precipitated with mineral acid.

The starting material used in this example may be obtained by condensing terephthalic acid-ethyl-ester-mono-hydrazide with maleic anhydride. It is advantageous to carry out the condensation in an inert diluent, such for example, as benzene or chlorobenzene. The condensation product crystallizes from alcohol in clusters of colorless small needles melting at 166–167° C. The substance dissolves smoothly in dilute soda solution.

If isophthalic acid-ethyl-ester-mono-hydrazide and maleic acid anhydride are used as starting materials for the condensation product in this example, there is obtained a β-substituted acrylic acid with similar properties.

What we claim is:

1. A substantially colorless compound which contains at least one 1:3:4-ox-diazole ring, in which compound all the nitrogen atoms are trivalent and which when applied to a substratum exhibits a green-blue to violet fluorescence in ultraviolet light and corresponds to the formula

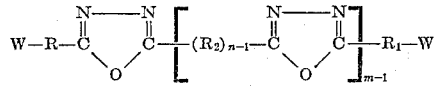

in which R, R₁ and R₂ are free from groups imparting dyestuff character to the molecule, R and R₁ each represents a member selected from the group consisting of a carbocyclic aryl radical containing at the most two carbocyclic six-membered rings, a —CH=CH-carbocyclic aryl radical containing one carbocyclic six-membered ring, and a —CH=CH— group; R₂ represents a radical selected from the group consisting of a carbocyclic aryl radical containing one carbocyclic six-membered ring, and a —CH=CH— group; W represents a salt-forming group selected from the class consisting of a sulfonic acid group, a carboxylic acid group, a primary amino group and a lower dialkylamino group; and $m$ and $n$ each represents a whole number of at the most 2.

2. A substantially colorless compound in which all the nitrogen atoms are trivalent and which when applied to a substratum exhibits a green-blue to violet fluorescence in ultraviolet light and in its free acid state corresponds to the formula

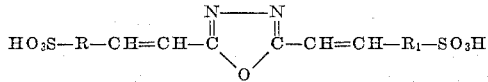

in which R and R₁ each represents a carbocyclic aryl radical containing one carbocyclic six-membered ring.

3. A substantially colorless compound in which all the nitrogen atoms are trivalent and which when applied to a substratum exhibits a green-blue to violet fluorescence in ultraviolet light and in its free acid state corresponds to the formula

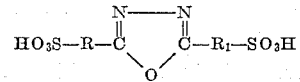

in which R and R₁ each represents a carbocyclic aryl radical containing at the most two and only carbocyclic six-membered rings.

4. A substantially colorless compound in which all the nitrogen atoms are trivalent and which when applied to a substratum exhibits a green-blue to violet fluorescence in ultraviolet light and in its free acid state corresponds to the formula

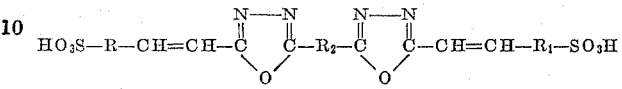

in which R, R₁ and R₂ each represents a carbocyclic aryl radical containing one carbocyclic six-membered ring.

5. A substantially colorless compound in which all the nitrogen atoms are trivalent and which when applied to a substratum exhibits a green-blue to violet fluorescence in ultraviolet light and in its free acid state corresponds to the formula

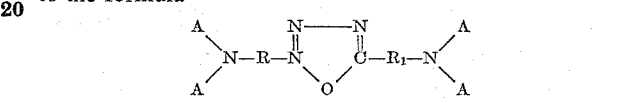

in which R and R₁ each represents a carbocyclic aryl radical containing one carbocyclic six-membered ring and A represents an alkyl group containing at the most two carbon atoms.

6. A substantially colorless compound in which all the nitrogen atoms are trivalent and which when applied to a substratum exhibits a green-blue to violet fluorescence in ultraviolet light and in its free acid state corresponds to the formula

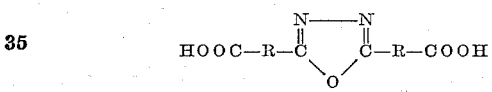

in which R and R₂ each represents a carbocyclic aryl radical containing one carbocyclic six-membered ring.

7. A process for the manufacture of a substantially colorless compound which contains at least one 1:3:4-ox-diazole ring, in which compound all the nitrogen atoms are trivalent and which when applied to a substratum exhibits a green-blue to violet fluorescence in ultraviolet light and corresponds to the formula

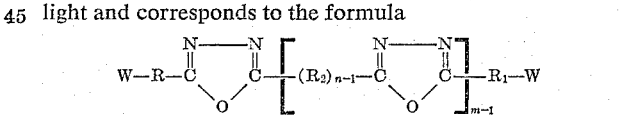

in which R, R₁ and R₂ are free from groups imparting dyestuff character to the molecule, R and R₁ each represents a member selected from the group consisting of a carbocyclic aryl radical containing at the most two carbocyclic six-membered rings, a —CH=CH-carbocyclic aryl radical containing one carbocyclic six-membered ring, and a —CH=CH— group; R₂ represents a radical selected from the group consisting of a carbocyclic aryl radical containing one carbocyclic six-membered ring, and a —CH=CH— group; W represents a salt-forming group selected from the group consisting of a sulfonic acid group, a carboxylic acid group, a primary amino group and a lower dialkylamino group; and $m$ and $n$ each represents a whole number of at the most 2, which process comprises splitting off water from a compound selected from the group consisting of compounds of the formulae

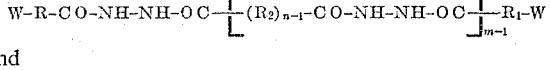

and

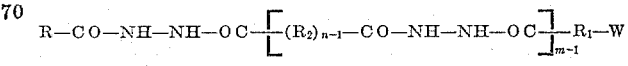

wherein the symbols R, R₁, R₂, W, $n$ and $m$ have the meanings given above, by treating it with a compound selected from the group consisting of chlorosulfonic acid and oleum, and introducing the group W when the second-named starting material is used.

8. A process according to claim 7, which comprises synthesizing the starting materials named in claim 7 in the same reaction medium which is used for the synthesis of the ox-diazole compound.

9. A process for the manufacture of a substantially colorless compound, in which all the nitrogen atoms are trivalent and which when applied to a substratum exhibits a green-blue to violet fluorescence in ultraviolet light and in its free acid state corresponds to the formula

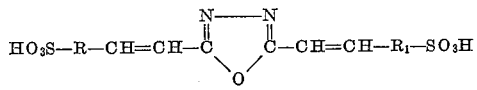

in which R and R₁ each represents a carbocyclic aryl radical containing one carbocyclic six-membered ring, which process comprises splitting off water from a compound of the formula

R—CH=CH—CO—NH—NH—OC—CH=CH—R₁ wherein R and R₁ have the meaning given above, and sulfonating the resulting compound, both reactions being effected by means of oleum.

10. A process according to claim 9, which comprises synthesizing the starting material named in claim 9 in the same reaction medium as is used for the synthesis of the ox-diazole compound.

11. A process for the manufacture of a substantially colorless compound, in which all the nitrogen atoms are trivalent and which when applied to a substratum exhibits a green-blue to violet fluorescence in ultraviolet light and in its free acid state corresponds to the formula

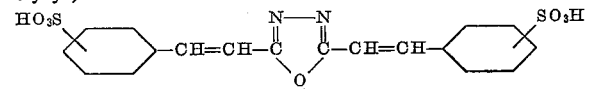

in which R and R₁ each represents a carbocyclic aryl radical containing one carbocyclic six-membered ring, which process comprises splitting off water from a compound of the formula

HOOC—R—CO—NH—NH—OC—R₁—COOH wherein R and R₁ have the meaning given above, by means of oleum.

12. A process according to claim 11, which comprises synthesizing the starting material named in claim 11 in the same reaction medium as is used for the synthesis of the ox-diazole compounds.

13. 2:5-bis-[sulfostyryl]-1:3:4-ox-diazole of the formula

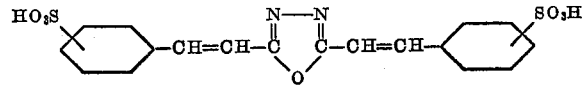

14. 2:5-bis-[sulfodiphenyl-(4')]-1:3:4-ox-diazole of the formula

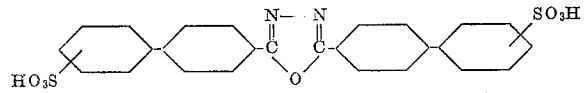

15. 2:5-bis-[4'-carboxyphenyl-(1')]-1:3:4 - ox-diazole of the formula

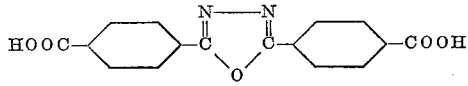

16. 2:5 - bis - [4' - dimethylaminophenyl - (1')] - 1:3:4 - ox - diazole of the formula

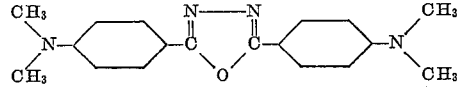

17. 1 - [5' - sulfostyryl - 1':3':4' - ox - diazolyl - (2')] - 4 - [5'' - sulfostyryl - 1'':2'':4'' - ox - diazolyl - (2'')] - benzene of the formula

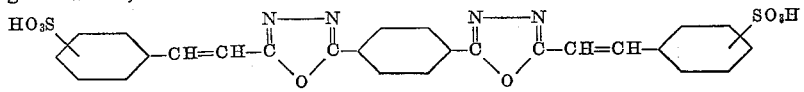

18. A process for the manufacture of 2:5 - bis - (sulfo-styryl) - 1:3:4 - ox - diazole of the formula

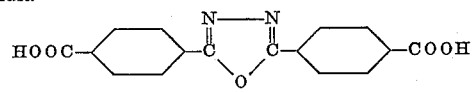

which comprises condensing one molecular proportion of hydrazine sulfate with two molecular proportions of cinnamic acid, splitting off water from the condensation product and sulfonating the resultant product, all three reactions being effected by means of oleum.

19. A process for the manufacture of 2:5 - bis - [4' - carboxyphenyl - (1')] - 1:3:4 - ox - diazole of the formula

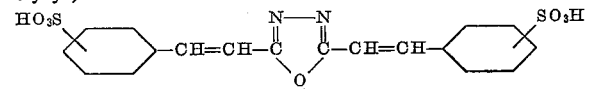

which comprises condensing one molecular proportion of hydrazine sulfate with two molecular proportions of terephthalic acid and splitting off water from the condensation product, both reactions being effected by means of oleum.

References Cited in the file of this patent

UNITED STATES PATENTS

| | | |
|---|---|---|
| 2,191,810 | Stevens | Feb. 27, 1940 |
| 2,320,654 | Reister | June 1, 1943 |
| 2,338,782 | Reister | Jan. 11, 1944 |
| 2,476,525 | Anish | July 19, 1949 |

FOREIGN PATENTS

| | | |
|---|---|---|
| 425,609 | Great Britain | 1933 |